US011300831B2

(12) United States Patent
Zhou

(10) Patent No.: US 11,300,831 B2
(45) Date of Patent: Apr. 12, 2022

(54) BACKLIGHT MODULE AND DISPLAY DEVICE

(71) Applicant: Wuhan China Star Optoelectronics Technology Co., Ltd., Wuhan (CN)

(72) Inventor: Zheng Zhou, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 248 days.

(21) Appl. No.: 16/625,736

(22) PCT Filed: Oct. 17, 2019

(86) PCT No.: PCT/CN2019/111605
§ 371 (c)(1),
(2) Date: Dec. 22, 2019

(87) PCT Pub. No.: WO2020/258599
PCT Pub. Date: Dec. 30, 2020

(65) Prior Publication Data
US 2021/0364860 A1 Nov. 25, 2021

(30) Foreign Application Priority Data

Jun. 25, 2019 (CN) .......................... 201910556270.3

(51) Int. Cl.
*G02F 1/13357* (2006.01)
(52) U.S. Cl.
CPC .. *G02F 1/133608* (2013.01); *G02F 1/133603* (2013.01)

(58) Field of Classification Search
CPC ................................................ G02F 1/133608
See application file for complete search history.

(56) References Cited

U.S. PATENT DOCUMENTS

| 2008/0112191 | A1* | 5/2008 | Wu | ........................ | H05K 7/142 362/634 |
| 2008/0143918 | A1* | 6/2008 | Kim | .................. | G02F 1/133608 349/58 |
| 2009/0268434 | A1* | 10/2009 | Mita | .................. | G02F 1/133608 362/97.1 |
| 2010/0246209 | A1* | 9/2010 | Park | ...................... | G02B 6/0083 362/606 |
| 2012/0014094 | A1* | 1/2012 | Yu | ...................... | G02F 1/133608 362/97.2 |

(Continued)

FOREIGN PATENT DOCUMENTS

| CN | 101943375 | 1/2011 |
| CN | 203787043 | 8/2014 |
| CN | 205353523 | 6/2016 |

(Continued)

*Primary Examiner* — Evan P Dzierzynski

(57) ABSTRACT

The present disclosure provides a backlight module and a display device. The backlight module comprises a substrate having a bottom surface; at least two openings disposed on surrounding sides of the substrate and passing through the entire substrate; and a glue frame surrounding and sealed on the surrounding sides of the substrate; wherein the glue frame is provided with a hook corresponding to the openings, and the hook penetrates through the openings from a surface away from the bottom surface of the substrate and is caught on and connected to the bottom surface of the substrate.

12 Claims, 2 Drawing Sheets

(56) References Cited

U.S. PATENT DOCUMENTS

2017/0329183 A1* 11/2017 Tsuchida ............ G02F 1/133606
2019/0064427 A1    2/2019 Xu et al.

FOREIGN PATENT DOCUMENTS

| CN | 106200124     | 12/2016 |
| CN | 107340645     | 11/2017 |
| CN | 207992650     | 10/2018 |
| KR | 10-2006-006764 | 6/2006  |

* cited by examiner

BACKLIGHT MODULE AND DISPLAY DEVICE

RELATED APPLICATIONS

This application is a National Phase of PCT Patent Application No. PCT/CN2019/111605 having International filing date of Oct. 17, 2019, which claims the benefit of priority of Chinese Provisional Patent Application No. 201910556270.3 filed on Jun. 25, 2019. The contents of the above applications are all incorporated by reference as if fully set forth herein in their entirety.

FIELD AND BACKGROUND OF INVENTION

The present disclosure relates to the field of backlight, and more particularly to a backlight module and a display device.

With rapid development of automotive industry, conventional car structures have been phased out. In new type of cars, a liquid crystal display device disposed in each car has become the mainstream trend. Because cars are driven outdoors and affected by the environment, such as outdoor lighting, LCD devices need to have high brightness to ensure the ability and quality of its display. Additionally, the requirements of high contrast, low power local dimming are also getting higher. Current cutting-edge technology is using a backlight with a direct light source (mini LED/with lens LED) to meet this demand.

Current LCD backlight systems are divided into a direct type and a side light type. A LED backlight source of the direct type is installed directly below a LCD panel, that is, on a rear cover of an LCD display device, and an optical cavity is between the two. Uniformity of illumination is achieved by varying spacings between LED illuminators and thickness of the optical cavity. The side light type is disposing LED illuminators on a side surface of an LCD panel and scattering light to the LCD panel by a light guide plate.

Current backlight structures of touch display panel used in cars are mainly side light type. However, it is difficult to meet requirements of high contrasts and low power consumption in this type. The current cutting-edge technology is using a direct-light source backlight that uses a mini LED or a surface-emitting light. The direct type backlight module can reduce the whole volume of a backlight module.

However, the direct type backlight is limited by light source structures and heat dissipation conditions, so the solution used to fix structures in conventional side light type light sources (conventional side light type backlight) is not applicable.

In order to solve the above technical problem, the present disclosure provides a backlight module and a display device to solve the problem that the solution used to fix structures in conventional side light type light sources cannot be ensured to fix the direct type light sources of backlights in current technology.

SUMMARY OF THE INVENTION

An embodiment of the present disclosure provides a technical solution to solve the above problems: a backlight module comprises a substrate having a bottom surface; at least two openings disposed on surrounding sides of the substrate and passing through the entire substrate; a glue frame surrounding and sealed on the surrounding sides of the substrate; wherein the glue frame is provided with a hook corresponding to the openings, and the hook penetrates through the openings from a surface away from the bottom surface of the substrate and is caught on and connected to the bottom surface of the substrate.

Further, there is a gap between the hook and the openings, and the backlight module comprises a sealant layer sealed in the gap and extending to the bottom surface.

Further, the backlight module comprises a plurality of LED chips arranged uniformly on a side of the substrate away from the bottom surface.

Further, the hook is an elastic plastic material.

Further, 10. The display device according to claim 6, wherein the glue frame is provided with a cavity corresponding to the openings, the cavity has a cavity bottom surface; the hook comprises a connection part and a hook part, the connection part is connected to the bottom surface and the hook part; wherein there is a gap between the substrate and the cavity bottom surface.

An embodiment of the present disclosure further provides a display device. The display device comprises the backlight module.

Further, the backlight module comprises a display area and a non-display area surrounding the display area; wherein the glue frame is disposed correspondingly in the non-display area.

Further, a step structure is disposed on a side of the glue frame away from a backboard, the step structure faces toward the display area; and the display device further comprises a diffusion layer and a display panel installed respectively on the step structure.

Further, the step structure comprises a first step, a second step, and a third step disposed upward in sequence from a side adjacent to the display area to a side away from the display area, the diffusion layer is disposed on the first step, and the display panel is disposed on the second step.

Further, a thickness of the diffusion layer is less than a height of the second step, and a height of the display panel is less than a height of the third step.

Beneficial Effect

The present disclosure provides a backlight module and a display device. A glue frame is sealed and covers surrounding sides of a substrate for protecting electrical components inside the substrate and preventing light leakage. Achieve the object of fixing the substrate and the glue frame by disposing openings on the substrate and disposing a hook penetrating through the openings and caught on and connected to the substrate, and meanwhile a layer of glue is sealed at junction of the hook and the openings for preventing light leakage and water vapor intrusion. The glue frame is designed as a step structure by disposing a diffusion plate and a display panel respectively on different steps to ensure a distance between the diffusion plate and the display panel and meanwhile to prevent light leakage effectively.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

In an embodiment of the present disclosure, a backlight module 10 comprises a substrate 110 and a glue frame 120.

Figure 1:
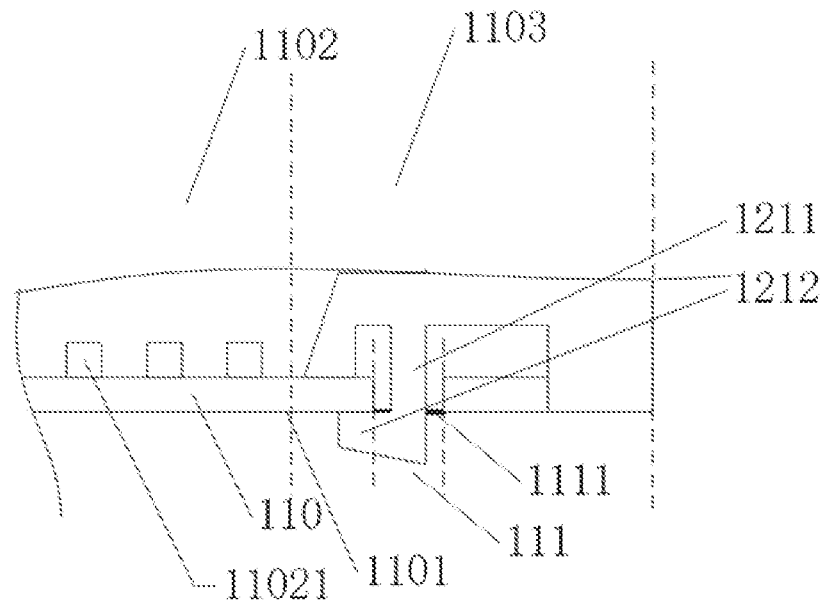
FIG. 1 is a partial schematic diagram of a backlight module according to embodiment 1.

As shown in FIG. 1, the substrate 110 has a bottom surface 1101, wherein the substrate 110 is provided with at least two openings 111. In the embodiment, the openings 111 are symmetrically distributed on both sides of the substrate 110.

The substrate 110 comprises a display area 1102 and a non-display area 1103 surrounding the display area 1102; the display area 1102 is provided with a plurality of LED chips 11021, and the LED chips 11021 are distributed uniformly in the display area 1102 for providing stable light sources.

The glue frame 120 surrounds sides of the substrate 110 and covers the non-display area 1103 for sealing the substrate 110 and preventing light leakage.

To better fix the substrate 110, the glue frame 120 is provided with a hook 121 corresponding to the openings 111 of the substrate 110. The hook 121 is an elastic plastic material which can be deformed under action of an external force, and the hook 121 can be restored to an initial state without applying an external force.

Figure 4:
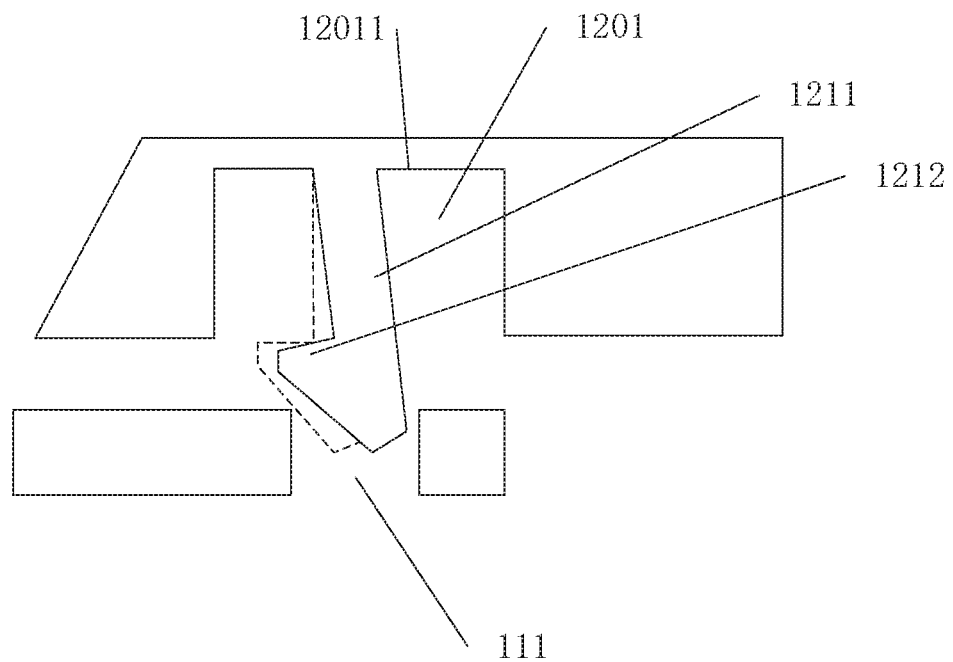
FIG. 4 is a partial schematic diagram of a hook according to embodiment 1.

As shown in FIG. 4, the glue frame 120 is provided with a cavity 1201 corresponding to the openings 111, the cavity 1201 has a cavity bottom surface 12011.

The hook 121 has a connection part 1211 and a hook part 1212. The connection part 1211 penetrates through the openings 111 to connect with the cavity bottom surface 12011 and the hook part 1212, wherein the glue frame 120 is provided with a gap corresponding to the openings 111 to facilitate assembly of the substrate 110 and the hook 121 and meanwhile to facilitate deformation of the hook part 1212 of the hook 121 to pass through the openings 111 and to catch on and connect to the bottom surface 1101 of the substrate 110.

Figure 3:
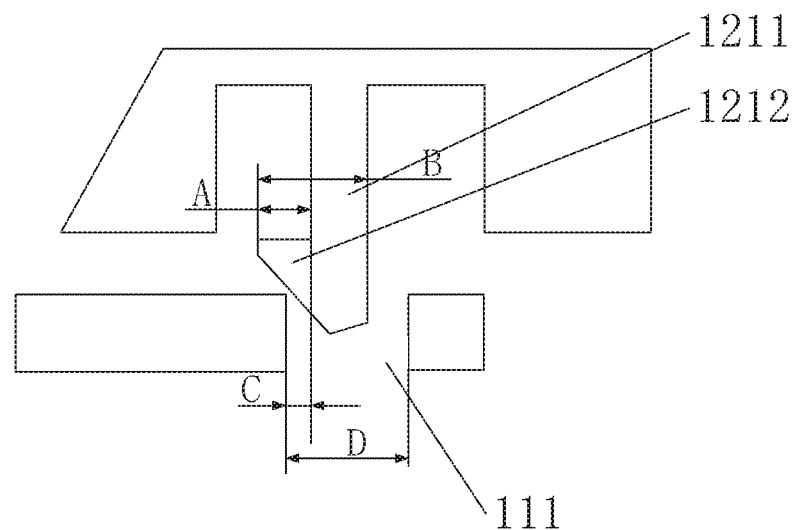
FIG. 3 is a schematic dimensional diagram of a hook according to embodiment 1.

As shown in FIG. 3, a width of the hook part 1212 is A, the sum of widths of the hook part 1212 and the connection part 1211 is B, the closest distance of the connection part 1211 to the openings 111 is C, and a width of the openings 111 is D. In order to ensure that the hook part 1212 completely passes through the openings 111 and is caught on and connected to the substrate 110, the sum of widths B of the hook part 1212 and the connection part 1211 is less than the width D of the openings 111 to facilitate the hook penetrating through the openings after slight deformation. The width A of the hook part 1212 is greater than the closest distance C of the connection part 1211 to the openings 111 to facilitate the hook to catch on and connect to the substrate 110 after penetrating through the openings 111.

As shown in FIG. 4, the hook part 1212 and the connection part 1211 have an angle. When the glue frame 120 is disposed on the substrate 110, the connection part 1211 is distorted to a predetermined angle by an external force, and when the openings 111 are under the hook part 1212, the hook part 1212 penetrates through the openings 111 by deformation. Because a distance from an edge of the hook part 1212 to the connection part 1211 is greater than a distance from a wall of the opening 111 on the same side to the connection part 1211, the hook part 1212 can be directly caught on and connected to the substrate 110 after penetrating through the openings 111 to achieve the effect of fixing the substrate 110. Additionally, the hook 121 just needs to fit the openings 111, high precision is not necessary for that, so that it can be widely produced and save cost.

To prevent light to pass through a gap between the hook part 1212 and the openings 111 and to cause light leakage, in the embodiment, a sealant layer 1111 is further included to seal the gap between the hook part 1212 and the openings 111.

Embodiment 2

Figure 2:
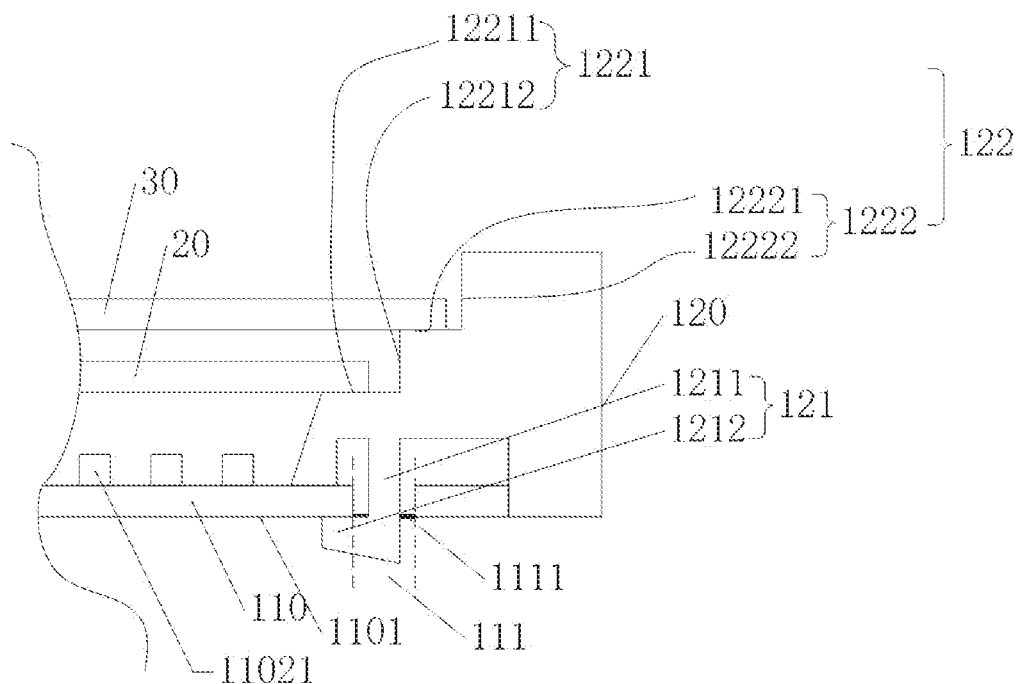
FIG. 2 is a schematic diagram of a display device according to embodiment 2.

As shown in FIG. 2, in the embodiment of the present disclosure, a display device comprises the backlight module 10 in embodiment 1, and further comprises a diffusion layer 20 and a display panel 30.

To hold the diffusion layer 20 and the display panel 30, the glue frame 120 further comprises a step structure 122 in the embodiment. The step structure 122 is disposed on one side of the substrate 110 away from the bottom surface 1101, that is facing toward the display area 1102. Specifically, the step structure 122 comprises a first step 1221, a second step 1222, and a third step.

The first step 1221 is disposed inside the glue frame 120, that is one side adjacent to the display area 1102. The first step 1221 comprises a first plane 12211 and a second plane 12212. Wherein the first plane 12211 is a horizontal plane, the second plane 12212 is an opposite plane of the first plane 12211, and an angle between the first plane 12211 and the second plane 12212 is greater than 90 degrees and less than 180 degrees to ensure stability of the first step 1221 and meanwhile to facilitate processing the first step structure 1221.

The diffusion layer 20 is disposed on the first plane 12211 of the first step 1221 for scattering light emitted from the LED chips 11021 to make light softer and uniform.

The first step 1221, the second step 1222, and the third step form a step structure. Wherein the second step 1222 comprises a third plane 12221 and a fourth plane 12222. The third plane 12221 and the second plane 12212 are opposite to each other and have an angle greater than 90 degrees and less than 180 degrees. The fourth plane 12222 is parallel to the first plane 12211.

The display panel 30 is disposed on the fourth plane 12222 to ensure a gap between the diffusion layer 20 and the display panel 30 that facilitates light transmittance. A height difference between the fourth plane 12222 and the first plane 12211 is greater than a thickness of the diffusion layer 20, and a thickness of the display panel 30 is less than a thickness of the third step.

The above are only preferred embodiments of the present disclosure and are not intended to limit the present disclosure. It is understood that many changes and modifications to the described embodiment can be carried out without departing from the scope and the spirit of the disclosure that is intended to be limited only by the appended claims.

What is claimed is:

1. A backlight module, comprising:
 a substrate having a bottom surface;
 at least two openings disposed on surrounding sides of the substrate and passing through the substrate; and
 a glue frame surrounding and sealed on the surrounding sides of the substrate; wherein the glue frame is provided with a hook corresponding to the openings, and the hook penetrates through the openings from a surface away from the bottom surface of the substrate and is caught on and connected to the bottom surface of the substrate; and there is a gap between the hook and the openings, and the backlight module comprises a sealant layer sealed in the gap and extending to the bottom surface.

2. The backlight module according to claim 1, further comprising:

a plurality of LED chips arranged uniformly on a side of the substrate away from the bottom surface.

3. The backlight module according to claim 1, wherein the hook is an elastic plastic material.

4. The backlight module according to claim 1, wherein the glue frame is provided with a cavity corresponding to the openings, and the cavity has a cavity bottom surface; and the hook comprises a connection part and a hook part, the connection part is connected to the cavity bottom surface and the hook part, and there is another gap between the substrate and the cavity bottom surface.

5. A display device, comprising the backlight module according to claim 1.

6. The display device according to claim 5, further comprising a plurality of LED chips arranged uniformly on a side of the substrate away from the bottom surface.

7. The display device according to claim 5, wherein the hook is an elastic plastic material.

8. The display device according to claim 5, wherein the glue frame is provided with a cavity corresponding to the openings, and the cavity has a cavity bottom surface; and the hook comprises a connection part and a hook part, the connection part is connected to the cavity bottom surface and the hook part, and there is another gap between the substrate and the cavity bottom surface.

9. The display device according to claim 5, further comprising a display area and a non-display area surrounding the display area; wherein the glue frame is disposed correspondingly in the non-display area.

10. The display device according to claim 9, wherein a step structure is disposed on a side of the glue frame away from a backboard and faces toward the display area; and the display device further comprises a diffusion layer and a display panel installed respectively on the step structure.

11. The display device according to claim 10, wherein the step structure comprises a first step, a second step, and a third step disposed upward in sequence from a side adjacent to the display area to a side away from the display area, the diffusion layer is disposed on the first step, and the display panel is disposed on the second step.

12. The display device according to claim 11, wherein a thickness of the diffusion layer is less than a height of the second step, and a height of the display panel is less than a height of the third step.

* * * * *